United States Patent [19]

Pearson

[11] Patent Number: 5,315,794

[45] Date of Patent: May 31, 1994

[54] ENCLOSURE FOR TELECOMMUNICATIONS EQUIPMENT

[75] Inventor: Gordon I. Pearson, Hernando, Fla.

[73] Assignee: Professional Systems, Inc., Waukesha, Wis.

[21] Appl. No.: 969,110

[22] Filed: Oct. 30, 1992

[51] Int. Cl.5 .............................................. E04H 1/00
[52] U.S. Cl. ........................................ 52/79.1; 52/20; 52/169.6
[58] Field of Search ............... 52/20, 169.6, 79.1, 52/79.5, 79.9, 19

[56] References Cited

U.S. PATENT DOCUMENTS

| 3,502,237 | 3/1970 | Verhein et al. | |
| 3,589,547 | 6/1971 | Hambleton | |
| 3,593,344 | 7/1971 | Logsdon | 52/20 X |
| 3,728,464 | 4/1973 | Griffing | 52/20 |
| 3,760,234 | 9/1973 | Jones | 317/111 |
| 3,784,727 | 1/1974 | Haubein | 174/52 R |
| 4,005,253 | 1/1977 | Walter | 52/20 X |
| 4,307,436 | 12/1981 | Eckart et al. | |
| 4,333,580 | 6/1982 | Sweigart | 52/20 X |
| 4,432,171 | 2/1984 | Boot | 52/79.1 |
| 4,441,286 | 4/1984 | Skvaril | 52/79.1 |
| 4,470,227 | 9/1984 | Bigelow | 52/79.1 |
| 4,901,202 | 2/1990 | Leschinger | |
| 4,914,874 | 4/1990 | Graham | 52/79.1 |
| 5,036,638 | 8/1991 | Kurtz, Jr. | 53/79.1 X |
| 5,235,133 | 8/1993 | Roth | 52/20 X |

OTHER PUBLICATIONS

1990 Sales Brochure of Reliance Comm/Tec.

Primary Examiner—Carl D. Friedman
Assistant Examiner—Beth A. Aubrey
Attorney, Agent, or Firm—Ryan, Kees & Hohenfeldt

[57] ABSTRACT

A modular housing for telecommunication equipment is provided having mating upper and lower modules and a supporting framework for the lower module that it is placed in an excavation in the earth. The lower framework is configured to receive a forklift truck from any side and is provided with upwardly extending vertical frame members connected to each corner thereof. The frame component and the upwardly extending members are all configured to nestingly receive and support the lower module. The upwardly extending frame members are provided with a loop or bolt at their upper ends to provide means to receive a strap, cable, chain, rope or similar lifting means.

6 Claims, 2 Drawing Sheets

ENCLOSURE FOR TELECOMMUNICATIONS EQUIPMENT

FIELD OF THE INVENTION

This invention relates to modular structures. More particularly, the invention relates to structures commonly known as universal enclosures for housing of telecommunications equipment such as loop electronics or the like at remote locations.

BACKGROUND OF THE INVENTION

It has become commonplace to house telecommunications equipment at locations remote from any central office or facility Such remotely located electronic equipment is placed so that messages can be sent directly from one nearby user to another without the need for routing through a central office.

The structures heretofore available to house such equipment have often paralleled conventional buildings. Since the telecommunications equipment is often contained in equipment bays that have a 23" width and a 7' height it has been common to reduce the visible height of the structures by burying the lower ends thereof in the ground. Either a concrete or steel lower section resembling a basement is conventionally used, and supports an upper structure, usually also formed of steel or concrete.

The structures in addition to housing the electronic telecommunications equipment may contain air conditioning equipment, smoke detectors, sump pumps, intrusion alarms, and standard electrical power connections.

SUMMARY OF THE INVENTION

It is an object of the present invention to provide an improved modular system for housing telecommunications equipment. It is a further object of the invention to provide such a system that includes a cage component that forms a framework for the lower portion of the structure that is buried in the ground.

A related object is to provide such a framework that can be transported by inserting the tines of a fork lift truck therein from any side. A further aspect of the invention relates to the use of a framework that becomes embedded in the ground to form a foundation for supporting the lower section of a structure in the ground.

A still further aspect of the invention relates to providing a modular structure wherein the lower or basement module is nestingly received on such a framework. A still further aspect of the invention relates to providing a framework that has vertical structural members connected to each of four corners to form a structure that will cradle or nest and support a lower module. A further related aspect is to provide attachment means at the top of the vertical members so that the framework can be lifted thereby during transportation and or placement into the ground, if desired. A still further aspect of the invention is to provide a structure wherein the entire framework and attachment or lifting means remain buried in place so that eventual removal of the structure from the earth is simplified by provision of a means for grasping the framework to lift it out of the ground.

A still further aspect of the invention is to provide a modular structure wherein upper and lower modules can be formed of a variety of materials such as concrete, steel, or glass fiber reinforced resins.

Briefly summarized the invention achieves it's objectives by providing mating upper and lower modules and a supporting framework for the lower module that it is placed in an excavation in the earth. The lower framework is provided with a quantity of upwardly extending vertical frame members. Preferably the framework is rectangular and a vertical member is connected to each corner thereof. The frame component and the upwardly extending members are all configured to nestingly receive and support the lower module. The upwardly extending frame members are provided with a loop or bolt at their upper ends to provide means to receive a strap, cable, chain, rope or similar lifting means.

DESCRIPTION OF THE DRAWINGS

The invention will be further set forth in the following detailed description and accompanying drawings wherein.

DETAILED DESCRIPTION

Referring specifically to the drawings, a modular structure of the present invention is generally identified by numeral 10. The modular enclosure includes a lower frame component 12, a lower or basement module 14 and an upper housing or module 16.

Figure 3:
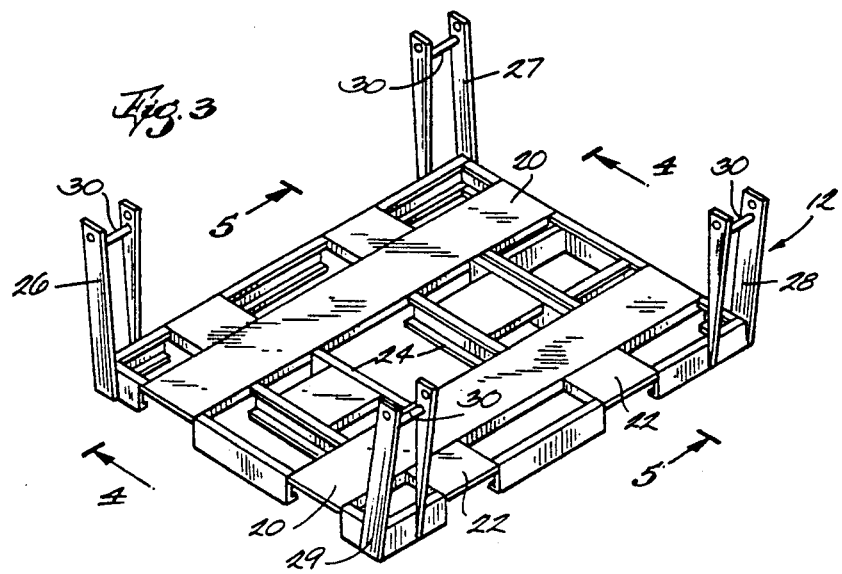
FIG. 3 is a perspective view of a framework component in accordance with the present invention.
Figure 4:
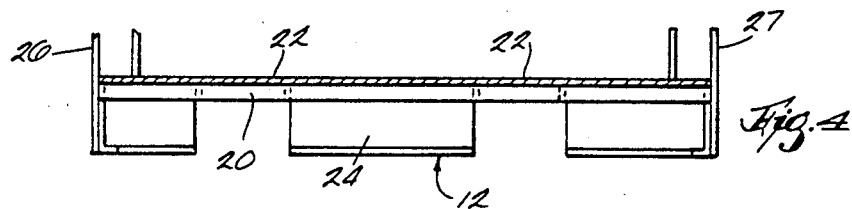
FIG. 4 is a fragmentary sectional view taken along Line 4—4 of FIG. 3.
Figure 5:
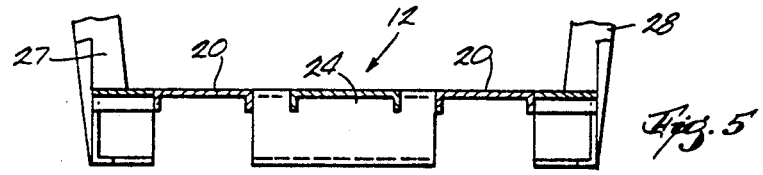
FIG. 5 is a fragmentary sectional view taken along Line 5—5 of FIG. 3.

As best seen in FIGS. 3-5 the supporting framework 12 is preferable formed by a plurality of parallel inverted U-shaped members or downwardly facing C-shaped members 20. Channels 20 are spaced so they readily accept the tines of a standard fork lift truck. Similarly shaped channel segments 22 are provided at right angles to channels 20 so that the framework 12 can be lifted from any direction by a fork lift truck. Other frame components 24 such as suitably dimensioned pieces of I-beams or C-channels are utilized to provide a desired degree of strength to framework 12. While frame members 24 are illustrated to be in a parallel orientation with channels 20 or 22, other shapes such as X-shaped or triangular brace members can be utilized as well.

Upright members 26, 27, 28, and 29 are positioned and attached to the four corners of frame 12. As shown, each of these upright frame components can be formed from a pair of metal plates, one of which extends over the end of the frame member 12 and the other of which has had a vertical inner surface. The two spaced plates in each case are connected at their upper ends by a cross member 30 which may be a metal rod welded between the two plates and which provides a means by which the framework can be lifted when desired by means of a cable, strap or chain.

Figure 6:
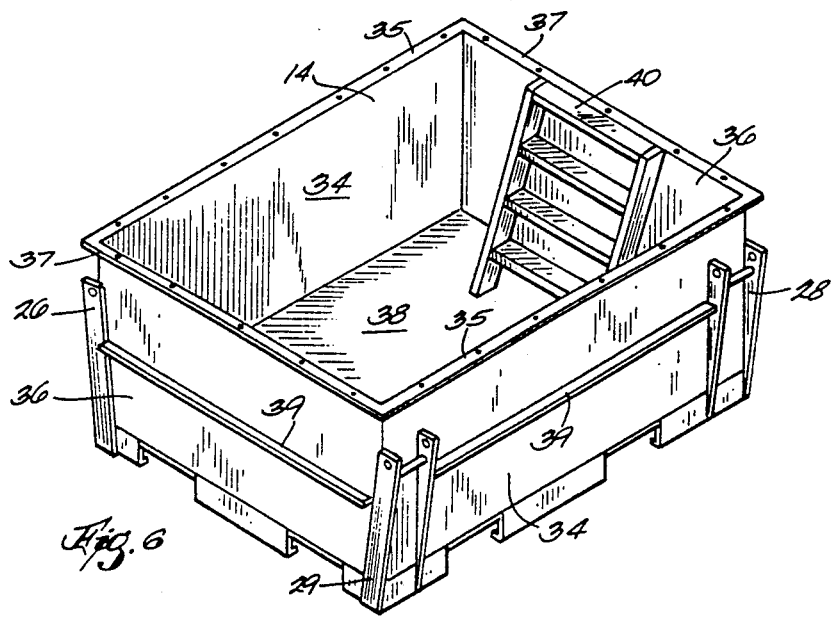
FIG. 6 is a perspective view of a lower module in accordance with the invention placed in a nesting relationship within a framework component.

It will be noted that when a bottom modular unit 14 is placed on the framework 12 and properly dimensioned to fit therein it will be prevented by the four upright members from moving in any direction. As best seen in FIG. 6 lower module or basement unit 14 includes opposed sidewalls 34 and opposed end walls 36. These walls are connected at their lower ends to a floor plate 38. Flanges 35 and 37 extend outwardly from the upper edges of walls 34 and 36, respectively. It is advantageous to provide re-enforcing ribs 39 around the perimeter of the lower modular unit 14. Ribs 39 are dimensioned so that they will fit between upright members 26, 27, 28, 29 as shown. Steps or a short ladder 40 can be provided for access to the structure.

Figure 2:
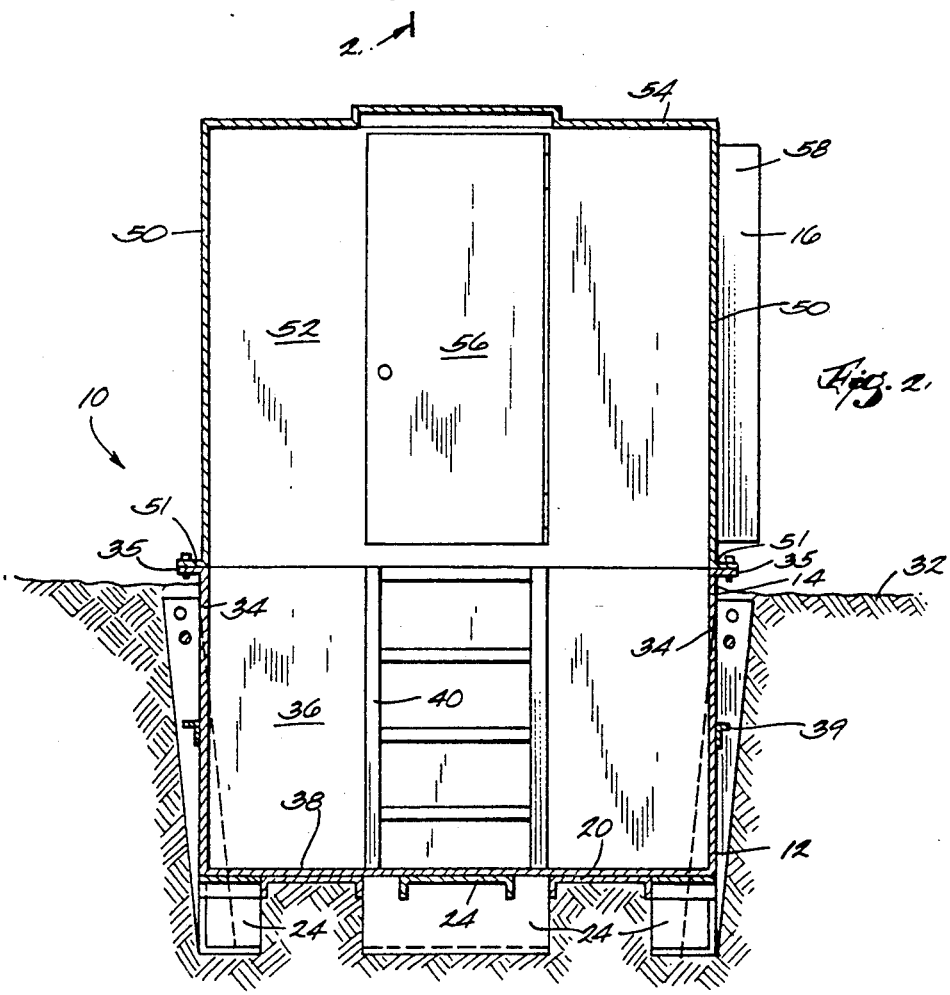
FIG. 2 is a cross sectional view taken along Line 2—2 of FIG. 1 showing the structure placed in an excavation in the earth.

As seen in FIG. 2 the framework 12 and lower module 14 are placed in an excavation in the earth 32 and then backfilled to form the desired structure. It will also be noted in FIG. 2 that in case floor 38 is, for example fiber or steel, that the cross members 20 and 24 provide a broad based support that prevent sagging of floor 38.

Figure 1:
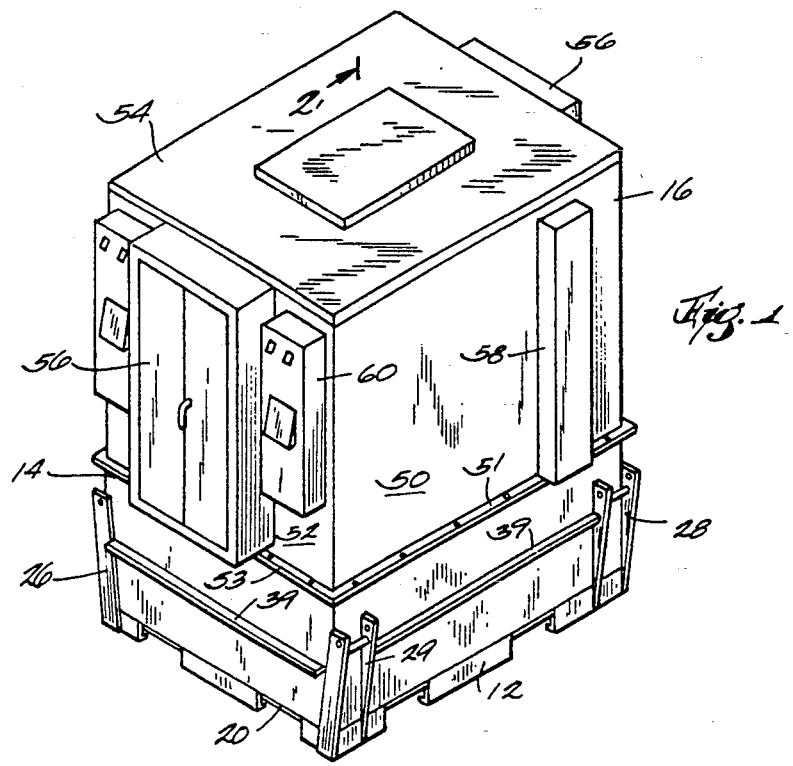
FIG. 1 is a perspective view of an assembled modular enclosure of this invention.

As seen in FIGS. 1 and 2, upper module 16 includes opposed side walls 50 and opposed end walls 52 in which at least one access door 56 is provided. The walls are interconnected with roof 54 along their upper edges. Various connection boxes or housings 58 and 60 are provided as needed for connection of the structure and components contained therein a two way telecommunication system and a source of power that runs the equipment contained in the structure.

The lower edges of walls 50 and 52 are provided with outwardly extended flanges 51 and 53, respectively. As best seen in FIG. 2 flanges 51 are dimensioned similarly to flanges 35 and are provided with aligned holes so that the flanges can be bolted together to firmly secure the top module 16 onto the lower module 15. Similarly flanges 53 adjoin flanges 37 on the lower module and are bolted together in the same manner.

It is seen that the invention provides a system whereby numerous different structures are provided using different combinations of upper and lower modules. A choice of materials such as steel, concrete or fiber reinforced polyester resin is available for use as upper and lower modules in any desired combination. The units are readily assembled by lowering the framework 12 into an excavation, placing the lower module therein, backfilling, and securing the upper module in place, either before or after backfilling. The enclosures are dimensioned to conveniently house a desired number of bays of electronic equipment. Generally the lower module forms somewhat less and the upper module somewhat more than one-half of the total height of the structure. These proportions, however, can be varied somewhat as desired.

While preferred embodiments of the invention have been described herein it will be readily apparent to those skilled in the art that various modifications thereof can be made without departing from the spirit of the invention. Accordingly the invention is to be limited only by the scope of the appended claims and equivalents thereof.

What is claimed is:

1. A modular structure for housing communication equipment comprising
   a lower framework having four sides and a bottom for placement in an excavation in the earth, said framework having four sides and a bottom for placement in an excavation in the earth, said framework having a plurality of upright frame members affixed to opposite sides thereof,
   said upright members being provided with means for engagement with a means for lifting said framework, whereby said framework can be lifted off of the ground,
   a basement module dimensioned for placement in a nesting relationship on said framework and between said upright frame members to form a lower enclosure, and,
   a mating upper module having at least one door therein for access to the interior thereof and having means at its lower perimeter for engagement with the top said basement module,
   said upper and basement modules being adapted, when interconnected, to provide a weatherproof enclosure.

2. A structure according to claim 1 wherein said bottom of said framework is provided with parallel openings on at least two sides for receiving the tines of a fork lift truck.

3. A structure according to claim 2 wherein said parallel openings are formed by inverted U-shaped channel members included in said bottom of said framework.

4. A structure according to claim 1 wherein said bottom of said lower framework is rectangular in shape and said four sides comprise at least one of said upright frame members located adjacent to each of the four corners of said lower framework.

5. A structure according to claim 1 wherein said basement module is formed of steel, fiberglass or cement.

6. A structure according to claim 5 wherein said upper module is formed of steel, fiber glass or cement.

* * * * *